June 28, 1949.　　　G. R. LEEF　　　2,474,260

DIELECTRIC MEASURING APPARATUS AND METHOD

Filed Jan. 11, 1947

INVENTOR.
GEORGE R. LEEF

BY *Percy P. Lantzy*

ATTORNEY

Patented June 28, 1949

2,474,260

UNITED STATES PATENT OFFICE 2,474,260

DIELECTRIC MEASURING APPARATUS AND METHOD

George R. Leef, East Orange, N. J., assignor to Federal Telephone and Radio Corporation, New York, N. Y., a corporation of Delaware Application January 11, 1947, Serial No. 721,606

2 Claims. (Cl. 175—183)

1

This invention relates to the measurement of dielectric constant and power factor at ultra high frequencies and more particularly to such measurements of liquid dielectrics. The principal object is to provide a method and means for making such high frequency dielectric measurements.

Dielectric measurements have heretofore been made on liquids at high frequencies by standing wave measurements made on coaxial lines or wave guides, in which the liquid forms the dielectric in a section of the line or guide. In such arrangements, the height of the liquid in the cell is important to the measurement, and being difficult to measure accurately, has been a cause of considerable error in the measurement.

By my present invention I provide a method and means for making the desired dielectric measurements at ultra-high frequencies, for example, of the order of 100 to 1000 megacycles per second. I carry out my invention by the provision of a cell comprising a section of coaxial transmission line filled with the liquid to be measured, and constructed so as to be resonant at the frequency of measurement.

In the practice of my invention I prefer to take readings dependent on the liquid dielectric, by introducing probes into the line, impressing an oscillatory voltage on one of the probes and taking measurement of the frequency and of the current or energy picked up at the other probe. From these frequency measurements I am able to compute the dielectric constant and power factor of the liquid from the relationships of these frequencies.

A feature of my novel construction is the provision of a cell having a central conductor protruding up through an outer shell to form a concentric line, with provision of means for completely filling the cell with the liquid under measurement to avoid error in ascertaining the height of the liquid in the cell.

A preferred related feature is the short-circuiting of the concentric line at one end and its termination in a capacitance at the other end.

Another preferred feature is the proportioning of the line to be substantially one-quarter wave length long at the frequency of measurement, this being the length at which a line short-circuited at one end is resonant.

Figure 1:
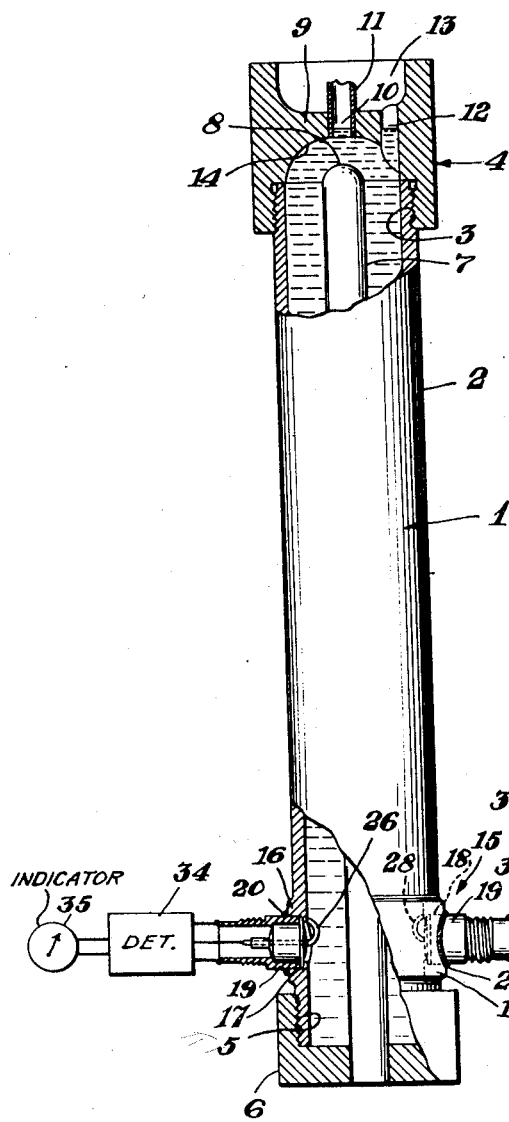
Figure 2:
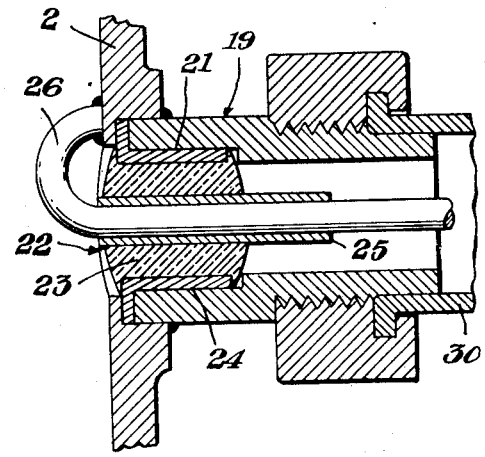

The foregoing and other features of the invention will be better understood from the following detailed description and the accompanying drawing of which:

Fig. 1 is a schematic and diagrammatic view showing partly in section a cell according to my invention and a measuring circuit attached to it; and Fig. 2 is a sectional view of a probe connection for the cell.

Referring to Fig. 1, the arrangement comprises a coaxial resonant line 1, having an upright cylindrical column or shell 2 of electrical conducting material. The column is provided with threads 3 at the upper end to receive a filling cap 4 and provided with threads 5 at the lower end to receive a base member 6.

The base member 6 is in the form of a cap or plug threaded to engage the threads 5 and having protruding centrally upwardly from it a conducting rod 7 rounded at the upper end 8 and arranged so that when the base 6 is threaded to the lower threads of column 2 the central rod 7 will extend concentrically up within the cylinder 2 and protrude above the top thereof.

The filling cap 4 is threaded to engage threads 3 and is hollow except for a horizontal webbing 9 extending across the cap and provided with a central hole 10 into which there is fitted a vent pipe 11. A conduit 12 also extends through the webbing 9. The upper portion of the cap above the webbing 9 is shaped in the form of a cup 13 into which the liquid may be poured and allowed to run down through conduit 12 into the cell. The under portion of webbing 9 is rounded to provide a rounded surface 14 conforming generally with the rounded surface 8 at the upper end of the rod and slightly spaced therefrom, thereby forming a small capacity between the rod 7 and the cap. While this capacity across the open end is not desirable it nevertheless causes no trouble since it merely makes the electrical length of the cell slightly greater than its physical length. The liquid whose dielectric constant and power factor is to be measured is poured into the receptacle 13 until the cell is filled as evidenced by the liquid rising in the vent pipe 11.

To provide for the introduction of terminal probes into the cell, there is provided a terminal mounting 15 at the lower end of the column, this terminal mounting being in the form of a ring-like portion 16 of greater thickness than the rest of the wall of the cylinder 2. This terminal mounting portion of the cylinder is provided with a pair of openings 17 and 18 respectively which pass therethrough into the interior of the cell. Each of these openings is adapted to receive a coupling member 19.

Each coupling member 19 (Fig. 2) is a hollow pipe fitting threaded at one end for coupling engagement with a coaxial cable, the other end being receivable in opening 17 or 18, as the case may be, where it is soldered to portion 16 as indicated at 20. The coupling member is recessed within at 21 for reception of a hermetic seal 22 which prevents the escape of the liquid from the cell. This hermetic seal 22 comprises a cylindrical insulating portion 23, ordinarily made of glass sealed to the inner wall of eyelet 24, ordinarily of metal; and a central conductor 25 is sealed through the glass. The conductor 25 may be a hollow metallic pipe construction, arranged to have the conductor of the probe pass through it. The seal will be completed by inserting the eyelet 24 into the coupling member 19. The seal can be made between member 25 and a probe 26 by soldering and the like.

Referring to Fig. 1, the cell will be used by standing it upright on its base 6 and pouring the dielectric to be measured into the filling recess 13 of the cap until the liquid completely fills the cell and rises into vent pipe 11. An adjustable frequency oscillator 27 has its output connected to the input probe 28, and for this purpose there is shown a coaxial line having an inner conductor 29 from the oscillator to the probe and the outer conductor 30 acting as the ground lead. A frequency meter is also connected to the output of the oscillator through a coaxial line having an inner conductor 32 and a grounded outer conductor 33, this being to measure the frequencies of the oscillations on the input probe. The output probe 26 is connected to a detector 34, preferably of the crystal type, and the output of the detector is connected to a suitable microammeter or galvanometer 35.

The dielectric and power factor of the liquid in the cell may be ascertained by making two sets of measurements, one set with the cell empty and the other set with the cell filled with the liquid. The procedure for each set of measurements is the same. The first set of measurements may be made, for example, with the cell empty, by adjusting the frequency of the variable frequency oscillator 27 until a maximum reading is obtained on the galvanometer or meter 35, indicating the condition of resonance of the cell; and this frequency of the oscillator is measured by reading the frequency meter 31. The oscillator frequency is then adjusted off resonance to reduce the galvanometer reading to indicate the receipt at the output probe of one-half the power picked up at the frequency of resonance. The use of a crystal detector 34 between the probe and the meter is very convenient for this purpose, because it is a square law detector, and the half-power condition can be readily ascertained on the meter by varying the frequency of the oscillator until the meter reads one-half of its reading at the resonance frequency. (This reading of one-half the current on the meter will indicate one-half of the maximum power, because the power is proportional to the square of the current; and since the detector itself operates on the square law, the effect is to make the meter read directly in proportion to the power received at the pickup probe.) The frequency of oscillator 27 at this condition of half-power is read on the frequency meter. Then, the oscillator frequency is adjusted to the opposite side of resonance until the power received at the pickup, as indicated by meter 35, is again one-half the maximum power, and this frequency is then read on the frequency meter.

Then, after filling the cell with the liquid as described above, these same adjustments and readings are then made.

From the readings thus taken, the dielectric constant and power factor of the liquid in terms of the measured quantities, is given by the following equations:

$$E' = \left(\frac{f_0}{f}\right)^2 \quad (1)$$

$$PF = \frac{\Delta f}{f} - \frac{\Delta f_0}{\sqrt{ff_0}} \quad (2)$$

Where:

$E'$=dielectric constant relative to air.
$PF$=power factor.
$f_0$=resonant frequency with cell empty.
$f$=resonant frequency with cell filled.
$\Delta f_0$=width of resonant peak, that is, difference in frequency between the upper and lower frequencies at which one-half power is measured, with cell empty.
$\Delta f$=width of resonance peak, that is frequency difference between upper and lower frequencies at which half-power is measured, with cell filled.

The derivation of Equations (1) and (2) can be readily demonstrated, and need not be explained in detail here.

The cell described above is especially well suited for measuring the dielectric constant at ultra-high frequencies, for example in the general vicinity of 300 megacycles per second. It may, however, be used at frequencies considerably different. For example, it has been used around 900 megacycles, and can even be used, although perhaps with somewhat more difficulty, at higher frequencies. Since the cell is also resonant at odd multiples of the fundamental operating frequency, a cell of the length to resonate for example at 300 megacycles, will also be resonant at 900 megacycles and other higher odd multiples of the fundamental operating frequency.

It would be possible, of course, to design cells of this type to operate at other frequencies than 300 megacycles, by changing the length accordingly, but as a general practice, the usual fundamental operating frequency range within which measurements can conveniently be made, will lie in the range of about 100 to 1000 megacycles per second.

A convenient cell material is brass. As an example of a suitable cell construction, a cell may be designed to resonate for example, at approximately 300 megacycles when filled with a liquid having a dielectric constant of 2.5, by making the column 2 with an overall length of $6\frac{1}{8}''$ and making its inside diameter $\frac{5}{8}''$ and its outside diameter $1\frac{1}{8}''$, the central rod with an outside diameter of $\frac{11}{64}''$ and an overall length from the bottom of the base to the end of the rounded tip of $6\frac{17}{32}''$.

It will be understood that the above dimensions are not by way of limitation, but merely by way of illustration of the proportions and size of the device found to be suitable for operation at 300 megacycles.

The cell constructed as described above, will be resonant for its length is one-quarter of the wave length of the fundamental frequency applied. It will also resonate at the odd multiples of the fundamental frequency, that is, it will resonate at those frequencies at which its length is three-quarters, five-quarters, etc., of the wave length.

By the use of my novel measuring cell, difficulties heretofore encountered by the use of other measuring methods are overcome. I find that by the use of my cell, little or no difficulty is encountered with stray parameters or the ascertaining of the liquid level because the cell is self-shielded and because the liquid fills the entire resonating cavity. Since the cell is a simple fixed cell, it involves no trouble due to variable contacts. Furthermore, since the cell operates on a frequency variation principle, it makes full use of the high accuracy with which frequencies can be measured to achieve a high accuracy in the measuring of dielectric properties. Furthermore, this cell has the advantage over many types of cells for U. H. F. measurements in that it is easily mounted in an oven or cold chamber for studies of dielectric properties over a wide range of temperatures.

It should be understood that the embodiment of the invention described herein is by way of illustration rather than of limitation, and that the invention is not to be limited except in accordance with the scope of the appended claims.

I claim:

1. A cell for measuring the electrical properties of liquid dielectrics at ultra-high frequencies, comprising a hollow tubular column, said column being closed at the base and having extending upwardly therein from the base a concentrically located rod, and having at the top a cap provided with an outlet vent and a filling vent, the upper end of said rod being rounded, and in proximity to said cap, said cap having a horizontal portion rounded to conform with and spaced from the rounded end of the rod to form a capacity therewith.

2. A cell for measuring the electrical properties of liquid dielectrics at ultra-high frequencies, comprising a hollow tubular column, said column being closed at the base and having extended upwardly therein from the base a concentrically located rod, the upper end of said rod being rounded, a cap enclosing the top of said tubular column above the end of said rod, the portion of said cap in proximity with the end of said rod being rounded to conform with and spaced from the rounded end of said rod to form a capacity therewith, a filling vent at the circumference of said rounded portion of the cap, and an overflow vent in that part of said cap where the rounded portion is highest above the end of the rod.

GEORGE R. LEEF.

REFERENCES CITED

The following references are of record in the file of this patent:

UNITED STATES PATENTS

| Number | Name | Date |
|---|---|---|
| 2,365,207 | Moles | Dec. 19, 1944 |

OTHER REFERENCES

Radio World December 1936, pages 26 and 27. (Copy in Div. 48.)

Reprint from the Proceedings of the I. R. E., vol. 33, No. 4, April 1945. A Resonant-Cavity Method for Measuring Dielectric Properties at Ultra-High Frequencies by Works et al. (Copy in Div. 48.)